United States Patent
Bar et al.

(10) Patent No.: US 9,097,039 B2
(45) Date of Patent: Aug. 4, 2015

(54) ESCAPE WINDOW ASSEMBLY AND MECHANISM THEREFOR

(76) Inventors: Zvika Bar, Kibbutz Tzuba (IL); Vitaliy Shcheglov, Jerusalem (IL)

( * ) Notice: Subject to any disclaimer, the term of this patent is extended or adjusted under 35 U.S.C. 154(b) by 0 days.

(21) Appl. No.: 14/003,048

(22) PCT Filed: Nov. 27, 2011

(86) PCT No.: PCT/IB2011/055315
§ 371 (c)(1),
(2), (4) Date: Sep. 4, 2013

(87) PCT Pub. No.: WO2012/073169
PCT Pub. Date: Jun. 7, 2012

(65) Prior Publication Data
US 2014/0053467 A1    Feb. 27, 2014

(30) Foreign Application Priority Data
Nov. 30, 2010   (IL) .......................... 209642

(51) Int. Cl.
*E05B 65/10* (2006.01)
*B60J 7/16* (2006.01)
*F41H 5/26* (2006.01)

(52) U.S. Cl.
CPC ........... *E05B 65/1033* (2013.01); *B60J 7/1642* (2013.01); *E05B 83/01* (2013.01); *F41H 5/263* (2013.01)

(58) Field of Classification Search
CPC .... E06B 65/1033; B60J 7/1642; E05B 83/01; F14H 5/263
USPC ............................ 49/141, 394, 395
See application file for complete search history.

(56) References Cited

U.S. PATENT DOCUMENTS

| | | | |
|---|---|---|---|
| 3,739,527 A | | 6/1973 | Shubach |
| 4,057,935 A | * | 11/1977 | Rohrberg et al. ................. 49/56 |
| 4,127,966 A | * | 12/1978 | Schmidt .......................... 49/141 |
| 4,263,747 A | * | 4/1981 | Coltrin et al. ..................... 49/56 |
| 4,305,612 A | * | 12/1981 | Hunt et al. ................. 292/336.3 |
| 4,495,728 A | | 1/1985 | Lynn |
| 4,635,396 A | | 1/1987 | Ranz et al. |
| 4,856,229 A | * | 8/1989 | Tserng .............................. 49/56 |
| 4,897,961 A | * | 2/1990 | Shine ............................. 49/141 |
| 5,007,200 A | * | 4/1991 | Londono ........................ 49/141 |
| 5,111,615 A | | 5/1992 | Kuhnt et al. |
| 5,504,974 A | * | 4/1996 | Graber ........................... 16/438 |
| 6,164,715 A | | 12/2000 | Mosaner |
| 6,216,391 B1 | * | 4/2001 | Garrett, Jr. ..................... 49/141 |

(Continued)

FOREIGN PATENT DOCUMENTS

WO    2008118151    10/2008

*Primary Examiner* — Jerry Redman
(74) *Attorney, Agent, or Firm* — Mark David Torche; Patwrite LLC

(57) ABSTRACT

An escape window assembly having a structure attachment frame for attaching the assembly to a structure; a window located on the outer side of the structure and pivotally attached to the structure attachment frame, the window corresponding to the structure attachment frame and comprising a window frame and a window pane; and a window release mechanism. The window release mechanism has a window release actuator; a first connection portion attached to the window; a second connection portion attached to the frame, the second connection portion releasably holding the first connection portion; and a biasing mechanism for pushing open the window.

11 Claims, 5 Drawing Sheets

(56) References Cited

U.S. PATENT DOCUMENTS

| | | | |
|---|---|---|---|
| 6,394,539 B1* | 5/2002 | Park | 296/216.02 |
| 6,427,383 B1 | 8/2002 | Brooks et al. | |
| 6,634,681 B1* | 10/2003 | Redden | 292/92 |
| 7,614,117 B2* | 11/2009 | Selvaraj | 16/258 |
| 7,938,479 B2* | 5/2011 | Tuhy | 296/190.11 |
| 8,418,404 B2* | 4/2013 | Gramstad et al. | 49/141 |
| 8,490,330 B2* | 7/2013 | Lund et al. | 49/141 |
| 2002/0178652 A1* | 12/2002 | Marks | 49/141 |
| 2007/0199245 A1* | 8/2007 | Peters | 49/141 |
| 2008/0295416 A1 | 12/2008 | Kintz | |
| 2011/0289850 A1* | 12/2011 | Helms et al. | 49/141 |

* cited by examiner

ESCAPE WINDOW ASSEMBLY AND MECHANISM THEREFOR

FIELD OF THE INVENTION

The present invention relates to safety systems, in particular escape mechanisms.

BACKGROUND OF THE INVENTION

Escape windows or ports are used to allow personnel to escape from closed structures, for example buildings and vehicles when the other standard openings are not available.

Examples of escape windows/mechanisms are disclosed in WO 2008/118151 (Hafften) "Vehicle emergency egress assembly"; U.S. Pat. No. 6,427,383 (Brooks) "Emergency exit system for aircraft or other vehicle"; U.S. Pat. No. 6,164,715 (Mosaner) "Emergency exit window of a vehicle with a window pane"; U.S. Pat. No. 4,635,396 (Ranz) "Bus window and release mechanism"; and U.S. Pat. No. 3,739,527 (Schubach) "Knockout window for vehicle".

SUMMARY OF THE INVENTION

The present invention relates to an escape window and mechanism therefor.

In accordance with embodiments of one aspect of the present invention there is provided an escape window assembly. The window assembly includes a structure attachment frame for attaching the assembly to a structure; and a window located on the outer side of the structure, pivotally attached to the structure attachment frame. The window corresponds to the structure attachment frame and has a window frame and a window pane. The assembly further includes a window release mechanism. The window release mechanism includes a window release actuator; a first connection portion attached to window; and a second connection portion attached to the structure attachment frame. The second connection portion releasably holds the first connection portion. The release mechanism further includes a biasing mechanism for pushing open the window.

According to some embodiments, the first connection portion includes at least one connection rod and the second connection portion includes at least one hook corresponding to the at least one connection rod. In some embodiments, the rod is held by a pair of rod supports. In some embodiments, the window release actuator comprises a handle, which in some embodiments includes at least one lever. In some embodiments, the window release mechanism includes at least one rod-engagement member with a window release actuator movement limiting mechanism. In some embodiments, the at least one rod-engagement member pivots on a pivot axes. In some embodiments, the window release actuator movement limiting mechanism includes a cooperating slot and movement limiting pin. In some embodiments, the window release mechanism further includes a window release actuator locking pin. In some embodiments, the window includes at least one U-shaped hook for pivotally attaching the window to the structure attachment frame whereby when the window opens the window can be moved apart from the frame.

In accordance with embodiments of another aspect of the present invention there is provided a mechanism for an escape window comprising: a window release mechanism comprising: a window release actuator; a first connection portion attached to window; a second connection portion attached to frame, the second connection portion releasably holding the first connection portion; and a biasing mechanism for pushing open the window.

In accordance with embodiments of another aspect of the present invention there is provided a method of operating an escape window assembly. The method includes moving a window release actuator in a first direction to release a safety pin and to actuate a window release mechanism; and then moving the window release actuator in a second direction to free a biasing mechanism of the window release mechanism. As a result, a window of the escape window assembly is pushed outward by the biasing mechanism. In some embodiments, after the window is pushed outward by the biasing mechanism, the window release actuator is secured in a particular position so the window does not interfere with escape.

The term "window" and its derivatives may be used in the specification and claims to represent any suitable egress port, including for example a door, a hatchway or the like.

BRIEF DESCRIPTION OF THE DRAWINGS

The present invention will be understood and appreciated more fully from the following detailed description taken in conjunction with the appended drawings in which.

Figure 1:
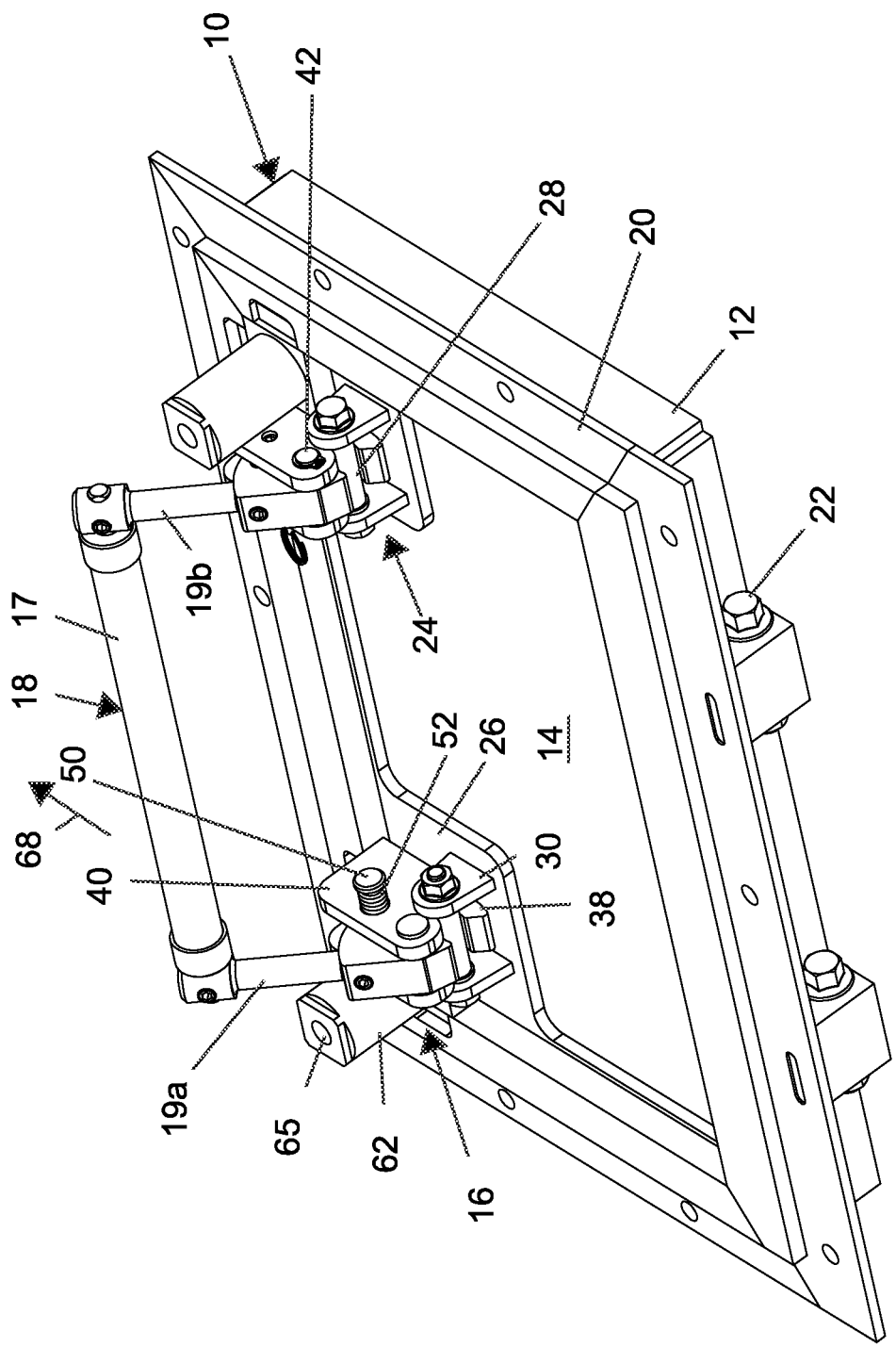
FIG. 1 is a perspective view of an embodiment of an escape window assembly of the present invention.
Figure 2:
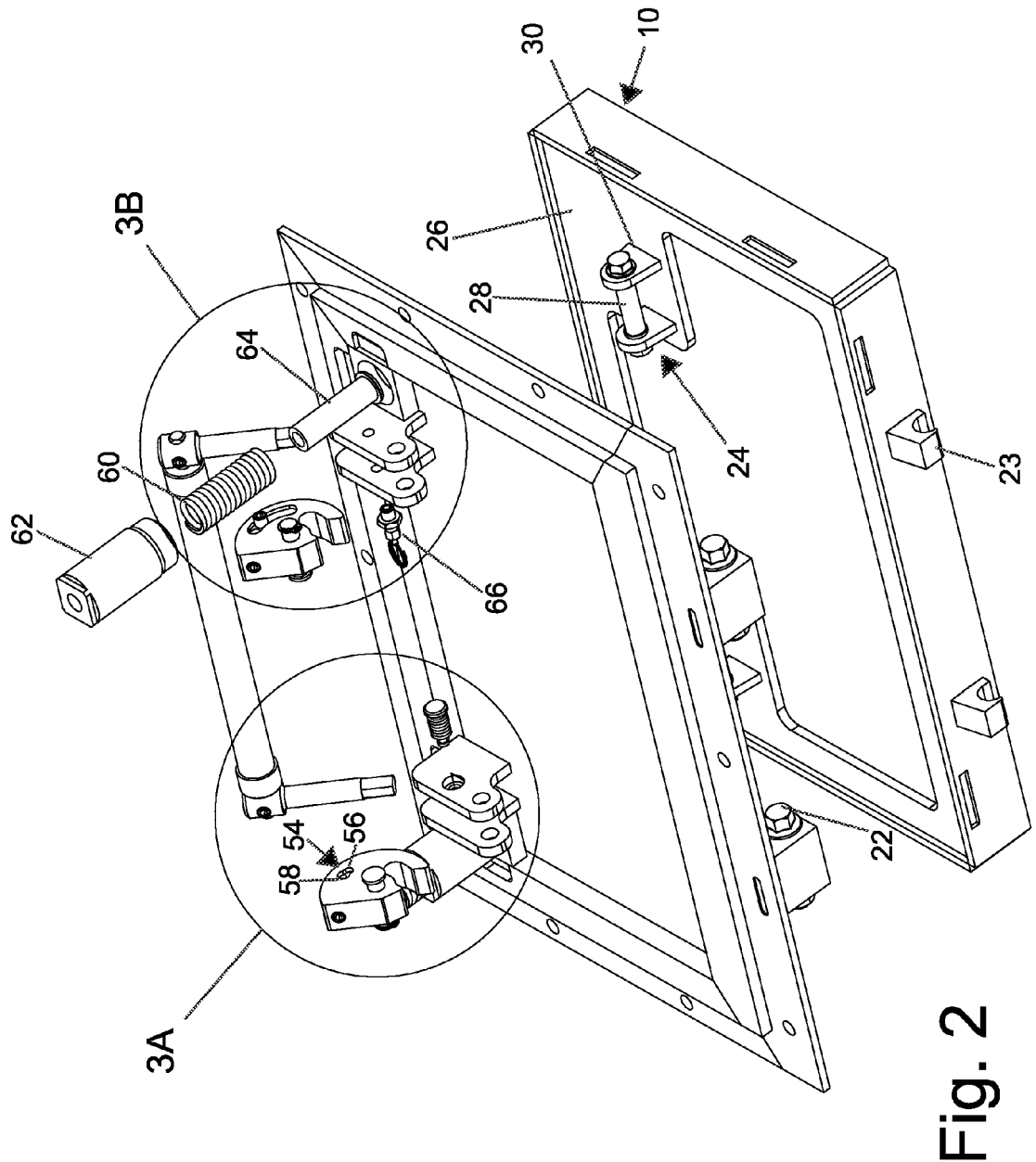
FIG. 2 is an exploded view of FIG. 1.
Figure 3:
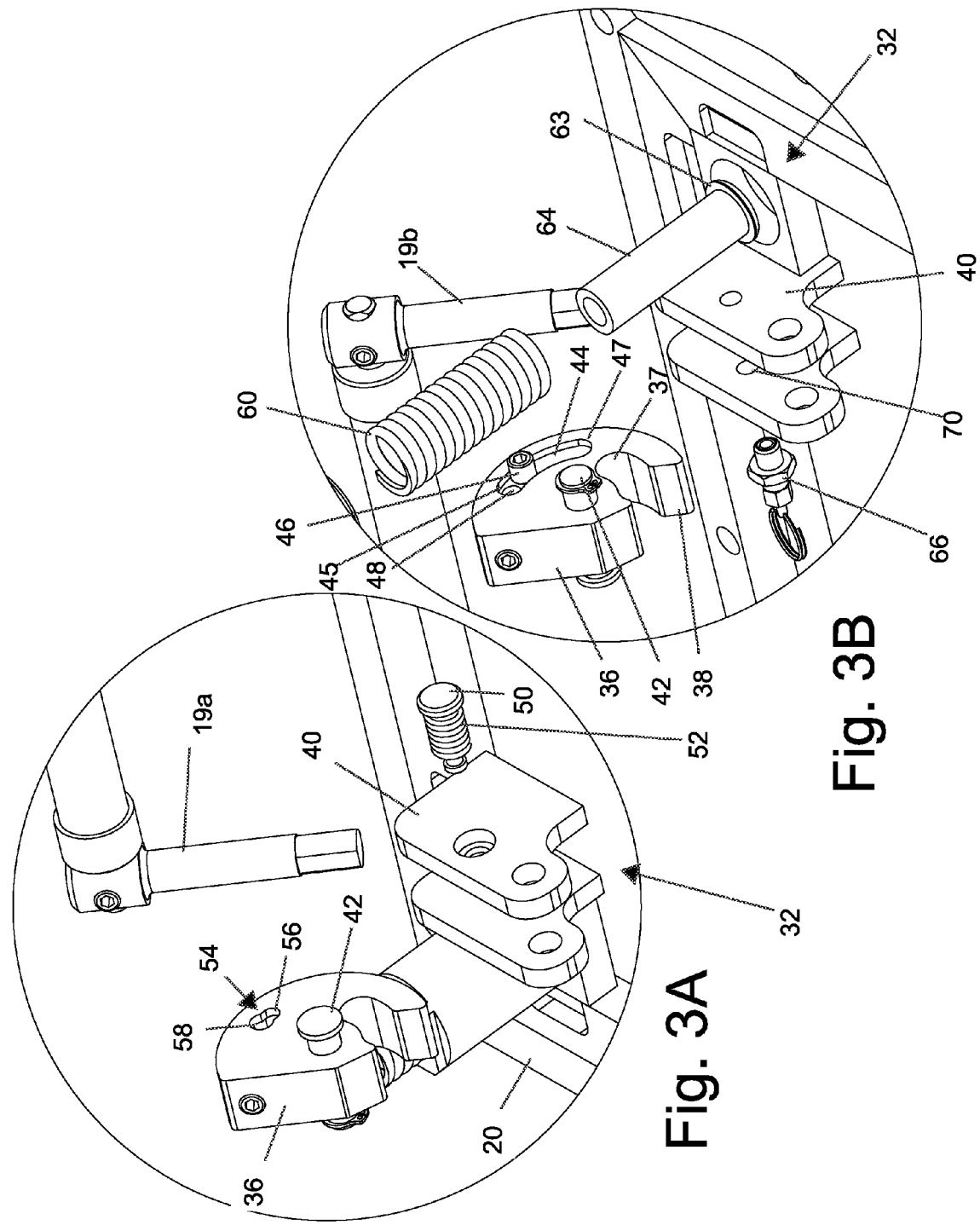
FIGS. 3A and 3B are enlarged views of portions 3A and 3B of FIG. 2, respectively.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DESCRIPTION OF EMBODIMENTS OF THE INVENTION

Illustrative embodiments of the invention are described below. In the interest of clarity, not all features/components of an actual implementation are necessarily described.

In the following embodiment, the window assembly of the present invention is inter-exchangeable between two positions. In a non-threatening condition, the window assembly is typically in the closed position, whereas in the event of risk, the window can be spread out to allow personnel to escape from closed structures, for example buildings and vehicles.

FIGS. 1-5 show an exemplary embodiment of an escape window assembly of the present invention in a closed position. The escape window assembly comprises: a window 10 with a window frame 12, for example, as shown, a frame allowing for multiple layers as is common for use in armored vehicles; a window pane 14 (again, which could comprise multiple layers); and a window release mechanism 16 actuated by a handle 18. In this example, handle 18 comprises a gripping portion 17 and a pair of handle levers 19a and 19b, which for convenience will be referred to as left lever and right lever corresponding to the figures. The assembly further includes a structure attachment frame 20 for attaching the assembly to a structure such as a vehicle or building. Window 10 is pivotally mounted on structure attachment frame 20 via a mounting axis 22 via generally U-shaped pivot hooks 23.

Window release mechanism 16 includes a first connection portion 24 (see FIGS. 2 and 5) attached to window 10, for example via a support plate, or pair of support plates 26 in this example, upon which the connection portion is mounted. Connection portion 24 comprises a connection rod 28 spaced apart from plate 26 by a pair of rod supports 30. Again, in this example there is a pair of rods 28. In this regard, it should be understood that although several of the components are depicted as implemented in pairs, the assembly can be constructed and implemented using one of such component, mutatis mutandis, and therefore this qualification will not be repeated.

Figure 5:
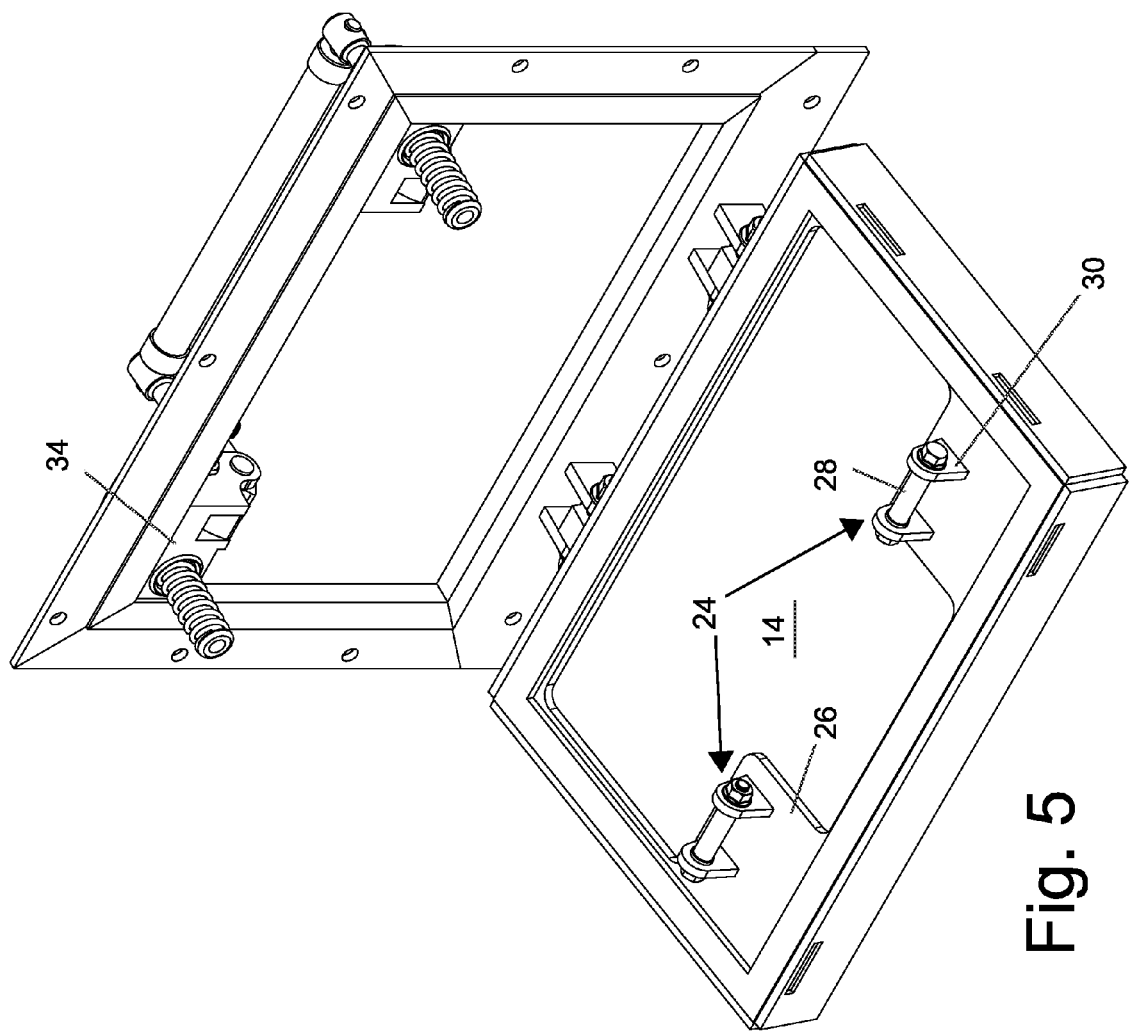
FIG. 5 is a view of the embodiment of FIG. 1 in a substantially open position.

FIGS. 3A and 3B show an exploded view of a second connection portion 32 of window release mechanism 16, with the second connection portion attached to frame 20 via a pair of support bases 34 (FIG. 5). Second connection portion 32 comprises: connection portion rod-engagement members 36 attached to levers 19 of handle 18 and the rod-engagement members have hooks 38 corresponding in shape and position to rods 28 of connection portion 24. Rod-engagement members 36 also have respective first concave surfaces 37 where hooks 38 extend from the rod-engagement members. Support bases 34 each have hook member pivot support pieces 40 for supporting a rod-engagement member and hook member pivot axis 42. One of the rod-engagement members 36 also has an arcuate slot 44 and a movement limiting pin 46 forming a window release actuator movement limiting mechanism. Arcuate slot 44 has a first handle movement limiting end 45 and a second handle movement limiting end 47.

To help prevent accidental actuation of the assembly, one of the rod-engagement members 36 of second connection portion 32 includes a safety pin 50 for preventing handle 18 from being accidentally pulled downward, which could result in window 10 being opened accidentally. Safety pin 50 is outwardly biased by a spring 52. The distal end of safety pin 50 enters a dual diameter aperture 54 of rod-engagement member 36—the aperture comprising a small diameter through-hole 56, in which the distal end of safety pin 50 is captured and situated in the non-active position, and a relatively large diameter through-hole 58.

Figure 4:
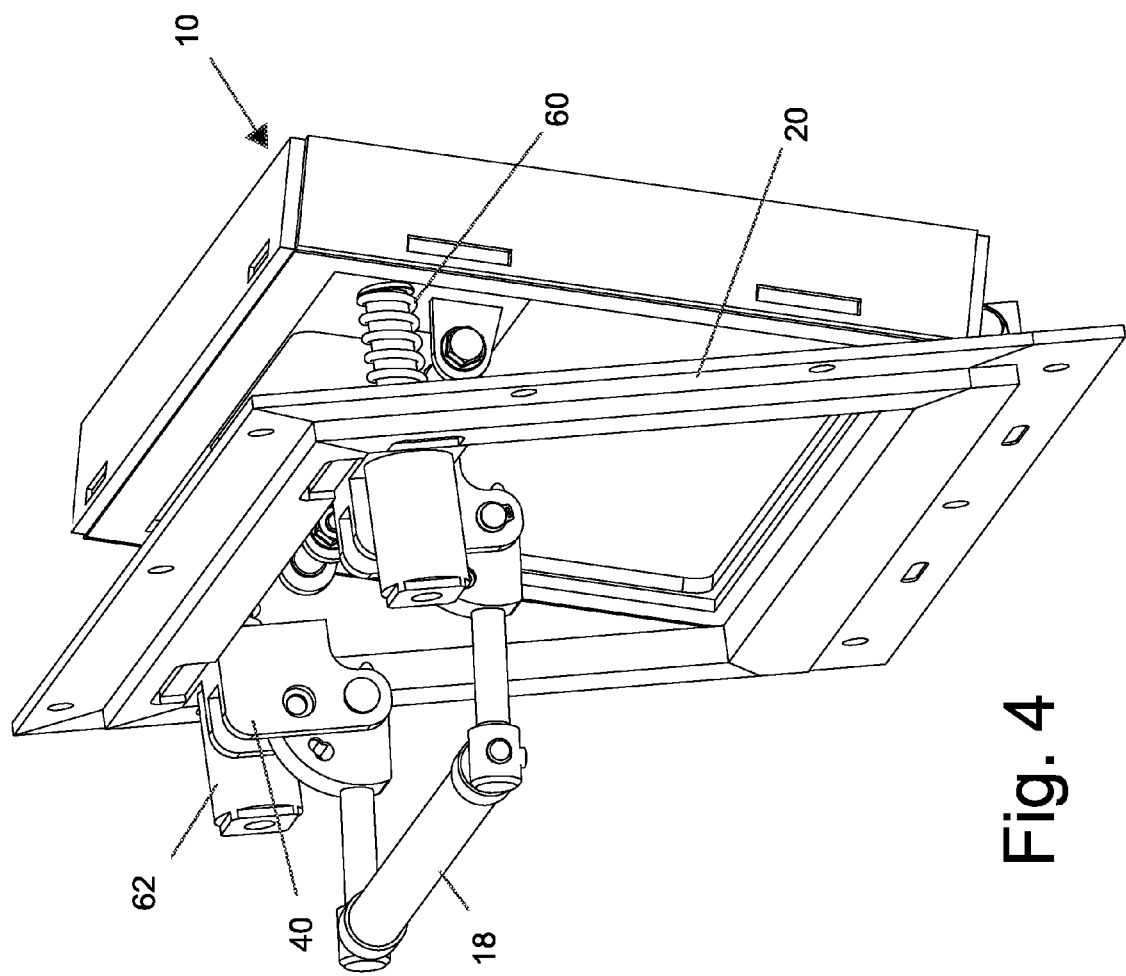
FIG. 4 is a view of the embodiment of FIG. 1 in a partially open position.

Window release mechanism 16 comprises a window opening biasing mechanism, for example a pair of coil springs 60 biased so as to push window 10 to an open position. FIG. 4 shows the window assembly with window 10 in a stage where the window is opening; and FIG. 5 shows the window in a substantially open position, although the particular position of the window can depend upon the configuration of the structure to which the window assembly is attached, inter alia). Springs 60 are housed in a spring housing 62, which typically also houses a spring support and loading element 64 having an annular shoulder 63. Spring support and loading element 64 can perform two functions: (1) when the window assembly is being assembled, spring support and loading element 64 can be used to compress spring 60 and hold the spring compressed until window 10 is closed and locked. This compression can be performed using an additional tool, for example a long threaded rod (not depicted), inserted through an aperture 65 in the rear end of spring housing 62 to engage internal threads (not visible) of spring loading element 64 to pull element 64 together with spring 60 into housing 62, whereby annular shoulder 63 pulls back on spring 60 to compress the spring; and (2) during the aforementioned compression of spring 60, element 64 provides support for the spring to prevent the spring from bending/deflecting to the side—and in a similar manner, when window 10 is released and starts to open, spring loading element 64 helps spring 60 transfer its force linearly (axially).

Associated with one of the rod-engagement members 36 is a handle locking pin 66 (see FIG. 2) for locking the handle in a particular position, for example to secure the handle in a position so the window does not interfere with escape.

Method of Operation

To effect operation of the window assembly, the user first pushes/moves handle 18 in the generally upward direction, as illustrated by arcuate arrow 68 (FIG. 1). As a result, engagement members 36 pivot in the same direction as arrow 68, and so dual diameter aperture 54 pivots similarly so that the distal end of safety pin 50 is moved from small diameter through-hole 56 of dual diameter aperture 54 to large diameter through-hole 58 whereby the safety pin is no longer captured, and spring 52 biases the pin outward to allow further movement of the handle. The upward movement of handle 18 is be limited by first concave surfaces 37 of rod-engagement members 36 coming into contact with rods 28. In some embodiments, the assembly does not include the aforementioned handle movement limiting mechanisms and handle 18 is moved upward until safety pin 50 has exited; and it can be understood that the movement of handle 18 can be limited in movement by window frame 12. In other embodiments, the sophisticated safety pin mechanism could be a standard manually operated pin (not shown) which is pulled out prior to moving the handle. In other embodiments, safety pin 50 is constituted by a breakable pin (not shown) that breaks upon the handle's movement (which could be a downward movement, mutatis mutandis).

Next, handle 18 is moved downward (FIG. 4) which moves hooks 38 from rods 28 to release the rods from being held by the hooks. As a result of this downward handle movement, arcuate slot 44 now moves in the opposite direction than when handle 18 was moved upward, typically until end 47 of the slot arrives to the other end movement limiting pin 46. Again, in theory there is no absolute need for this handle movement limiting mechanism as one could pull down on handle 18 until window 10 is released. When hooks 38 release their hold on rods 28, coil springs 60 push the window out to provide an escape opening, and window 10 is in an open position, for example as shown in FIG. 5, although if there is no outside obstruction, the window can potentially open further and be moved apart from the frame 20 (e.g. fall freely away or be pushed away completely) due to the design of U-shaped pivot hooks 23.

To provide more escape room or simply prevent handle 18 from getting in the way, the handle is preferably once again moved upward, until handle locking pin 66 biased by an internal spring (not shown), is aligned and enters corresponding hole 70 on the appropriate support piece 40 and hole 48 on the appropriate rod-engagement member 36 whereby the handle is locked in the upper position. Alternatively, the assembly is adapted whereby handle locking pin 66 can be pushed inward to a second position which locks the handle.

Thus there has been described embodiments of the present escape window assembly whereby escape can be easily and conveniently achieved even in the event the user has been injured as only one appendage (hand) is required and a relatively low amount of energy by the user is available.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. An escape window assembly comprising:
   a structure attachment frame for attaching the assembly to a structure having an outer side;
   a window located on the outer side of said structure and pivotally attached to said structure attachment frame, the window corresponding to said structure attachment frame and comprising a window frame and a window pane; and
   a window release mechanism comprising:
      a window release actuator;
      a first connection portion attached to the window;
      a second connection portion attached to the structure attachment frame, said second connection portion releasably holding said first connection portion; and
      a biasing mechanism configured to push open the window upon operation of the window release mechanism.

2. The assembly according to claim 1, wherein the first connection portion comprises at least one connection rod and the second connection portion comprises at least one hook corresponding to said at least one connection rod of the first connection portion.

3. The assembly according to claim 2, wherein the rod is held by a pair of rod supports.

4. The assembly according to claim 1, wherein the window release actuator comprises a handle.

5. The assembly according to claim 4, wherein the handle comprises at least one lever.

6. The assembly according to claim 1, wherein the window release mechanism comprises at least one rod-engagement member with a window release actuator movement limiting mechanism.

7. The assembly according to claim 6, wherein the at least one rod-engagement member pivots on a pivot axes.

8. The assembly according to claim 6, wherein the window release actuator movement limiting mechanism comprises a cooperating slot and movement limiting pin.

9. The assembly according to claim 1, wherein the window release mechanism further comprises a window release actuator locking pin.

10. The assembly according to claim 1, wherein the window comprises at least one U-shaped hook for pivotally attaching the window to the structure attachment frame whereby when the window opens, the window can be moved apart from the structure attachment frame.

11. The assembly according to claim 1, wherein the biasing mechanism comprises a coil spring.

* * * * *